United States Patent [19]
Mason

[11] Patent Number: 6,044,757
[45] Date of Patent: Apr. 4, 2000

[54] REMOVABLE END COVER FOR CYLINDER SHAPED FOOD ROLLS

[76] Inventor: Marvin Gene Mason, 5912 Rainbow Springs Dr., Chattanooga, Tenn. 37416

[21] Appl. No.: 09/215,104

[22] Filed: Dec. 18, 1998

[51] Int. Cl.[7] .............................. A23B 4/32; A23N 15/00
[52] U.S. Cl. ............................ 99/645; 99/485; 99/646 R
[58] Field of Search .................................. 99/645, 646 R, 99/646 C, 485; 452/39, 35, 21, 22; 206/802; 426/138, 135, 132, 106, 115, 418–420; 138/103, 109

[56] References Cited

U.S. PATENT DOCUMENTS

| | | | |
|---|---|---|---|
| 170,223 | 9/1875 | Black | 99/645 |
| 787,021 | 4/1905 | Biber | 99/645 |
| 925,489 | 6/1909 | Lindsay | 99/645 |
| 1,011,862 | 12/1911 | Seitz . | |
| 1,013,244 | 1/1912 | Watson | 426/132 |
| 1,324,659 | 12/1919 | Gibson | 99/645 |
| 1,431,918 | 10/1922 | Arthur . | |
| 2,070,829 | 2/1937 | Everly | 99/645 |
| 2,598,789 | 10/1952 | Harrell | 99/645 |
| 2,622,760 | 12/1952 | Kissig | 99/645 |
| 2,716,066 | 6/1955 | Baker | 426/213 |
| 2,822,275 | 2/1958 | Schmidt . | |
| 2,943,944 | 7/1960 | Janus . | |
| 3,139,348 | 6/1964 | Reifers et al. | 426/132 |
| 3,556,390 | 1/1971 | Encino et al. . | |
| 4,007,761 | 2/1977 | Beckman . | |
| 4,061,785 | 12/1977 | Nishino et al. | 426/124 |
| 4,327,777 | 5/1982 | Michel et al. . | |
| 4,385,554 | 5/1983 | Daenen et al. | 99/645 |
| 4,777,054 | 10/1988 | Greenhouse | 426/115 |
| 5,215,495 | 6/1993 | Crevasse . | |
| 5,248,081 | 9/1993 | Hook . | |
| 5,273,482 | 12/1993 | Beckman . | |

Primary Examiner—Timothy Simone
Attorney, Agent, or Firm—Akin, Gump, Strauss, Hauer & Feld, L.L.P.

[57] ABSTRACT

An end cover for detachable connection on the end of a cylindrical shaped food roll. The end cover has an end plate with an external side that displays information such as advertising or marketing indicia. A retaining member extends from the end plate and forms an interference fit with the external surface of the food roll when the end cover is installed onto the food roll.

20 Claims, 3 Drawing Sheets

REMOVABLE END COVER FOR CYLINDER SHAPED FOOD ROLLS

FIELD OF THE INVENTION

The present invention relates to covers for food items. More particularly, the present invention relates to a reusable cover that can be placed on the end of a food roll for the purpose of displaying advertising indicia, and or for covering the end of the food roll after it has been opened.

BACKGROUND OF THE INVENTION

A number of food items are packaged and sold in cylinder shaped rolls, including raw or cooked sausage and other meats, cookie dough, and the like. The dimensions of food rolls can vary from one product to the next, but regardless of these dimensional variations, most food rolls, when sold, will have a uniform circular cross section over most of their length and rounded or tapered ends.

Food rolls are usually encased in unitary, throw-away plastic packages. The external surface of a food roll package generally displays information pertaining to the maker of the food product, ingredients of the food product, expiration or freshness dates, etc. However, the rounded ends of food rolls are generally not well suited for displaying such information, or other information such as advertising and marketing indicia. Consequently, a need exists for a device that can be used on the ends of food rolls for displaying information.

Food rolls often come in packages that contain more food material than will be consumed at one time. The buyer of such a food roll will usually cut off a portion of the food roll for immediate use, and save the remainder of the food roll for later use. The saved portion of the food roll is left with an open end that exposes the food item in the food roll to the environment outside of the package. These packages generally do not include a closure means that can be used to seal off and protect the exposed end of the food roll, so the consumer must provide his or her own means for sealing the end of the food roll, such as aluminum foil or plastic wraps that are commonly available in grocery stores. The use of such items on a repetitive basis may be undesirable to many people, who would prefer to accomplish this task by means of a reusable cover.

From the foregoing, it is seen that a need exists for a reusable cover that can be installed onto the ends of food rolls, for the purpose of displaying information such as marketing and advertising indicia, and or for the purpose of minimizing the exposure of an opened end of a food roll to the environment.

SUMMARY OF THE INVENTION

The present invention provides an end cover that can be detachably connected to both the opened and unopened end of a cylindrical food roll of a predetermined size, including a predetermined food roll diameter, for the purpose of displaying information at an end of the food roll and for limiting the exposure of an opened end of the food roll to the environment.

The end cover includes an end plate with an external side adapted to display information such as marketing indicia, an internal side, and a thickness therebetween. A retaining member having a proximate end connected to the end plate extends away from the internal side to a distal entry end that is adapted to receive an end of the food roll.

The retaining member has an inside surface that provides an internal volume with a volume length and a substantially uniform cross section area that is sufficient to accommodate at least a portion of the length of the food roll. At least one gripping surface is positioned on the inside surface to resiliently bear against and apply force to an external surface of the food roll, and the retaining member has at least one other surface adapted to apply force to an external surface of the food roll, when the food roll is inserted into the volume through the distal entry end.

According to another aspect of the invention, the end plate includes an indicia surface that is recessed within the thickness of the end plate an inset distance from the external side.

According to another aspect of the invention, a label adapted to display advertising information is connected to the indicia surface, and the label has a thickness that is less than the inset distance.

According to another aspect of the invention, the retaining member comprises a tubular portion at the proximate end, that has a tube length extending from said proximate end towards said distal entry end.

According to another aspect of the invention, the retaining member comprises one or more resilient beam members extending from the tubular portion towards the distal entry end, and a gripping surface is positioned on each beam member to resiliently bear against an external surface of the food roll to bias the food roll into contact with a portion of the inside surface found on said tubular portion.

According to another aspect of the invention, the beam members are evenly spaced on a circumference of the retaining member.

According to another aspect of the invention, the resilient beam members each include a gripping member with a gripping surface found thereon that extends from the beam members towards a central axis of the end cover. The gripping surfaces are positioned on a gripping circumference with a gripping diameter that is less than the predetermined diameter of the food roll, so that when the end cover is installed upon an end of the food roll, the gripping surfaces resiliently bear against an external surface of the food roll to retain the end cover on the food roll.

According to another aspect of the invention, at least one of the gripping members has a forward sloped surface extending from the beam member to the gripping surface, that faces the distal entry end of the retaining member.

According to another aspect of the invention, at least one of the gripping members has at least two sloped surfaces extending from the resilient beam member to the gripping surface.

According to another aspect of the invention, the retaining member comprises a unitary elastic sleeve, having an inside surface with a relaxed, substantially uniform diameter that is less than the predetermined diameter of the food roll, and that is elastically expandable to at least the predetermined diameter of the food roll, so that when the elastic sleeve is placed over an end of the food roll, the inside surface encircles at least a portion of a length of the food roll and applies force to an external surface of the food roll to retain the end cover on the food roll.

According to another aspect of the invention, the distal entry end of said elastic sleeve terminates in a lip.

DETAILED DESCRIPTION OF A PREFERRED EMBODIMENT

Figure 1:
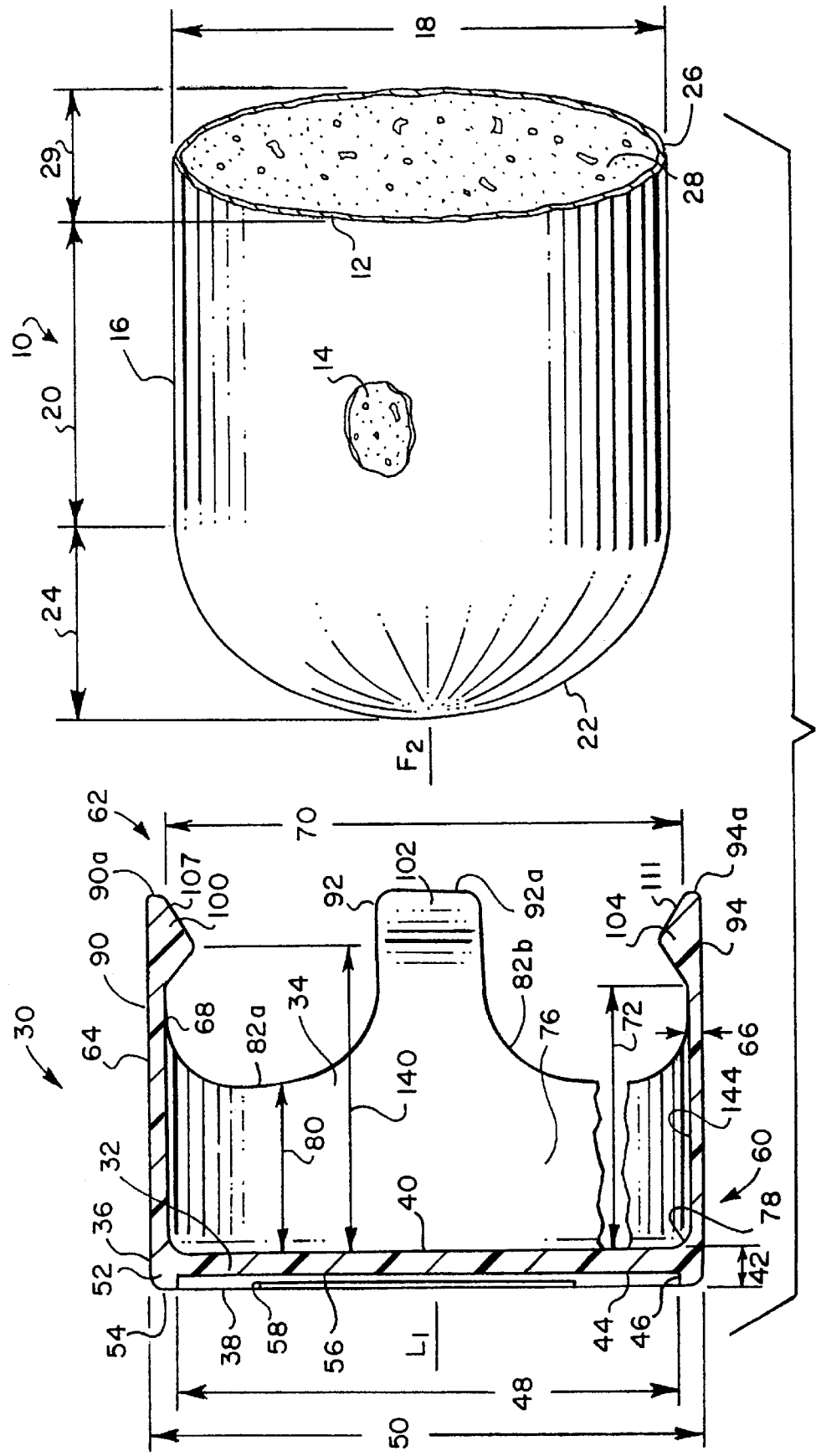
FIG. 1 is a side elevation of a first embodiment end cover shown in section view, and a view of a food roll with an opened and an unopened end.

FIG. 1 shows a cylindrical food roll (10). The food roll includes a unitary throw-away package (12) made from a plastic or other suitable material that is filled with a food item (14) such as sausage, other types of meats, cookie dough, or the like.

The package has an external surface (16) and a substantially uniform, predetermined diameter (18) over a major length portion (20). End (22) is rounded, with a predetermined length (24) and is typical of the end configuration of a food roll as it is sold in grocery stores. End (26) is shown in a configuration where a portion of the food roll and package have been cut off and removed by the consumer, leaving a portion (28) of the food item exposed to the environment. The cut or opened end (26) of the food roll will usually have a length (29), since most consumers will not cut the food roll at a precise right angle to the central axis $F_1$ of the food roll. Such length will of course vary from one opened end to the next, depending upon how the food roll is cut by the consumer.

An end cover (30) adapted for detachable engagement with both the opened and unopened end of a food roll is shown in FIG. 1. It is to be understood that the end covers described herein are not limited to a particular size, and that their dimensions can vary as needed to accommodate a food roll of a predetermined size and diameter. The end cover (30) illustrated in FIG. 1 is preferably a unitary item made from high density polyethylene, and may also be made from a polypropylene homopolymer material.

The end cover includes an end plate (32) and a retaining member (34). The end plate (32) has a circumference surface (36), an external side (38) adapted to display information, an internal side (40), and a thickness (42).

The end plate (32) includes an indicia surface (44) that displays advertising or other types of information (not shown). The indicia surface is preferably, but not necessarily, recessed into the thickness (42) by an inset distance (46) as measured from the external side. The indicia surface has a diameter (48) that is less than the diameter (50) of the end plate. The respective diameters (50) and (48) of the end plate and indicia surface are selected as desired to provide a bead (52) with a shield surface (54) on the external side (38) adjacent the circumference surface (36).

An adhesive backed label (56) having a thickness (58), and bearing information such as marketing or advertising indicia (not shown), is connected to the indicia surface (44). The label thickness (58) can be less than the inset distance (46), and if so, the label (56) will lie completely within the thickness (42) of the end plate (32) and not protrude beyond the shield surface portion (54) of external side (38). Consequently, any such labels will be shielded to some extent from damage during handling, packaging, shipment, etc, by the shield surface (54).

Figure 2:
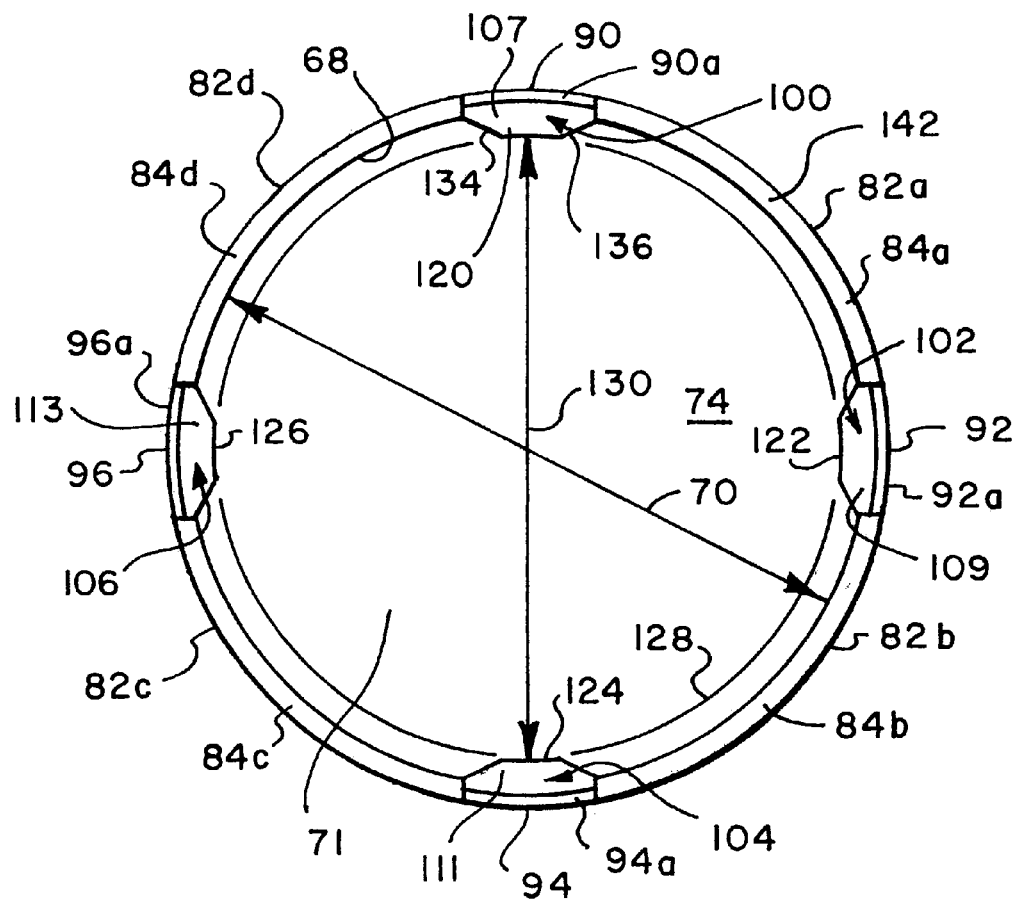
FIG. 2 is an end view of the end cover embodiment shown in FIG. 1.

Retaining member (34) has a proximate end (60) connected to the end plate (32), and extends away from the internal side (40) to a distal entry end (62) that is adapted to receive ends (22) and (26) of the food roll. The retaining member includes an external surface (64), a wall thickness (66), and an inside surface (68). As seen in FIG. 2, the inside surface (68) has an internal diameter (70) and a circular cross section area (71). Diameter (70) is selected to be slightly larger than the diameter (18) of food roll (10). The inside surface (68) has a length portion (72) that, together with the circular cross section area (71), provides an internal (74) volume within the retaining member sufficient to accommodate a desired length of the food roll.

The proximate end (60) includes a tubular portion (76) that is connected by radiused corner (78) to the internal side (40) of the end plate (32). The tubular portion has a tube length (80) extending from the internal side (40) partway towards the distal entry end (62) to rounded tube ends (82a), (82b), (82c), and (82d). Each of rounded tube ends include a chamfered surface (84a), (84b), (84c), and (84d) that slopes inward towards the central longitudinal axis $L_1$ of the end cover (30), with the degree of the chamfer preferably being 45 degrees. Providing a chamfer on these edges can facilitate the installation of the end cover onto a food roll by minimizing the possibility of snags between the food roll and rounded ends (82a), (82b), (82c) and (82d).

Resilient beam members (90), (92), (94) and (96) are connected to and extend away from the rounded tube ends (82a), (82b), (82c), and (82d), towards the distal entry end (62). The resilient beam members terminate at flat tip surfaces (90a), (92a), (94a) and (96a). The resilient beam members include gripping members (100), (102), (104), and (106) that extend from the inside surface (68) towards central axis $L_1$.

Figure 3:
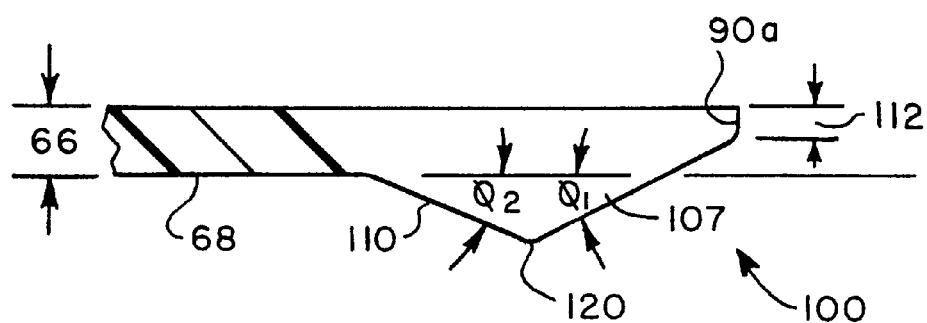
FIG. 3 is an enlarged detail view of a gripping surface for the end cover.

The construction of gripping member (100) is shown in greater detail in FIG. 3, and is typical of the construction of the other gripping members (102), (104) and (106). Gripping member (100) includes a forward sloped surface (107) facing the distal entry end (62) and a reverse sloped surface (110) facing the end plate (32). The similarly constructed gripping members (102), (104) and (106) have forward sloping surfaces (109), (111) and (113) respectively. The forward and reverse sloped surfaces are positioned at angles $\phi_1$ and $\phi_2$ with respect to inside surface (68), and in the preferred embodiment, the angles $\phi_1$ and $\phi_2$ are each thirty degrees. The forward sloped surface (107) extends into the flat tip surface (90a), which has a thickness (112) that is less than the wall thickness (66) of the retaining member (34).

The forward and reverse sloped surfaces (108) and (110) meet at gripping surface (120). Referring to FIG. 2, the gripping surfaces (120), (122), (124), and (126) are shown positioned along a gripping circumference (128) having a gripping diameter (130), which is selected to be slightly less than the diameter (18) of the food roll (10). As seen in FIG. 2, sides (134) and (136) of gripping member (100) are sloped, and the degree of the slope may be selected as desired to vary the size of gripping surface (120). The other gripping members (102, (104) and (106) may also be provided with sloped side surfaces.

The gripping surfaces (120), (122), (124), and (126) are positioned a distance (140) from internal side (40) of end plate (32). Distance (140) is selected to ensure that the gripping surfaces will be positioned on and resiliently bear against the major length portion (20) of the food roll (10) when the end cover is fully installed onto unopened end (22) of the food roll. In other words, distance (140) will be longer than the predetermined length (24) of the rounded end (22) of the food roll on which the cap will be used.

Beam members (90), (92), (94), and (96) are evenly spaced at 90° along the circumference (128) of the retaining member (34), which evenly spaces the gripping surfaces (120), (122), (124), and (126) along the gripping circumference (128). One skilled in the art will recognize that the retaining member (34) may comprise one or more beam members. If more than one beam member is used, the beams are preferably evenly spaced along the retaining member circumference (142) so that the gripping surfaces found on the beam portions will evenly apply loads to the food roll.

A retaining member (34) may also be constructed with a single resilient beam member. For example, the retaining member could be provided with a single resilient beam member (90) and gripping surface (120). When the end cover (30) is fully installed onto the food roll (10), the gripping surface (120) will resiliently bear against and apply force to the external surface (16) of the food roll (10). The food roll will be biased into a portion (144) of the inside surface (68) on the tubular portion (76), which will apply an opposing force to the external surface (16) of the food roll.

Figure 4:
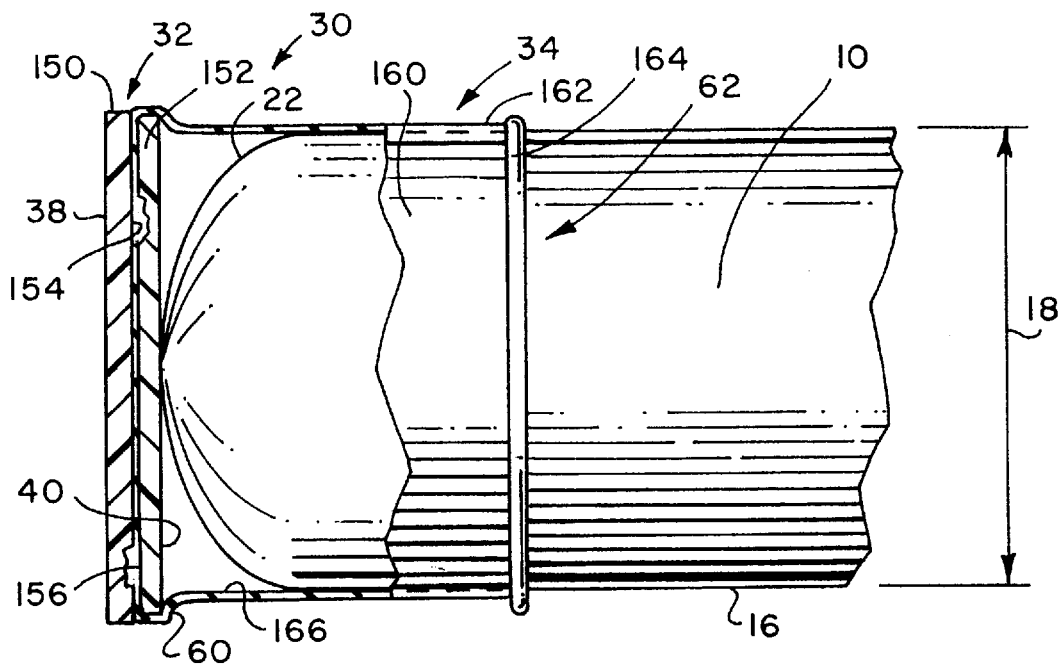
FIG. 4 is a side elevation view of an alternative embodiment end cover, shown in partial section view, installed on an unopened end of a food roll.

An alternative embodiment of the end cover (30) is shown installed on the rounded end (22) of food roll (10) in FIG. 4. In this embodiment, end plate (32) is a two piece member having a first plate (150) and a second plate (152). The first plate includes external side (38) that is adapted to display information, a first plate faying surface (154), and can have a recessed indicia surface (not shown) and label (not shown) of the same configuration as that shown on the embodiment depicted in FIG. 1. The second plate (152) includes internal side (40) and a second plate faying surface (156). Each of the plates are preferably made from an acrylic plastic, and may also be made from a high density polyethylene or a polypropylene homopolymer material.

The retaining member (34) comprises a unitary, elastic sleeve (160) with proximate end (60) joined to end plate (32). The proximate end is positioned between the faying surfaces (154) and (156), and the faying surfaces and proximate end (60) are permanently joined together using means known to those skilled in the art, such as bonding with epoxy adhesives.

The elastic sleeve (160) extends from the internal side (40) for a sleeve length (162) to distal entry end (62) and terminates in a lip (164). The lip provides structural strength to the end of the sleeve, and, as later described, is used to facilitate the installation of the end cover onto the food roll.

The sleeve has an internal surface (166) with a relaxed diameter (not shown) that is less than the predetermined diameter (18) of the food roll (10) and that is substantially continuous for the sleeve length (162). The sleeve is made from a material such as latex that has the degree of elasticity necessary to permit the sleeve to expand to predetermined food roll diameter (18) when the end cover (30) is installed onto the food roll. The sleeve length (162) is longer than predetermined end length (24) on the food roll, to ensure that at least a portion of the inside surface (166) will be positioned against the major length (20) when the end cover is installed onto the food roll.

The operation of placing an end cover (30) on the rounded end (22) of the food roll will now be described with respect to FIGS. 1 and 2. The end cover (30) is positioned near end (22) with the central axis ($F_1$) of the food roll in substantial alignment with the central axis ($L_1$) of the end cover. The end cover is moved towards the end of the food roll, whereupon the external surface (16) of the food roll contacts the forward sloped surfaces (107), (109), (111) and (113).

As the end cover continues to move onto the food roll, the resilient beam members (90), (92), (94) and (96) flex outward relative to the central axis ($L_1$) of the end cover and gripping surfaces (120), (122), (124) and (126) ride up the rounded end (22) onto the major length (20). The end cover is moved further in this direction until its internal side (40) rests against the end (22) of the food roll. In this position, the gripping surfaces and the food roll external surface form an interference fit, and the gripping surfaces resiliently bear against and apply force to the external surface to retain the cover on the food roll.

Figure 5:
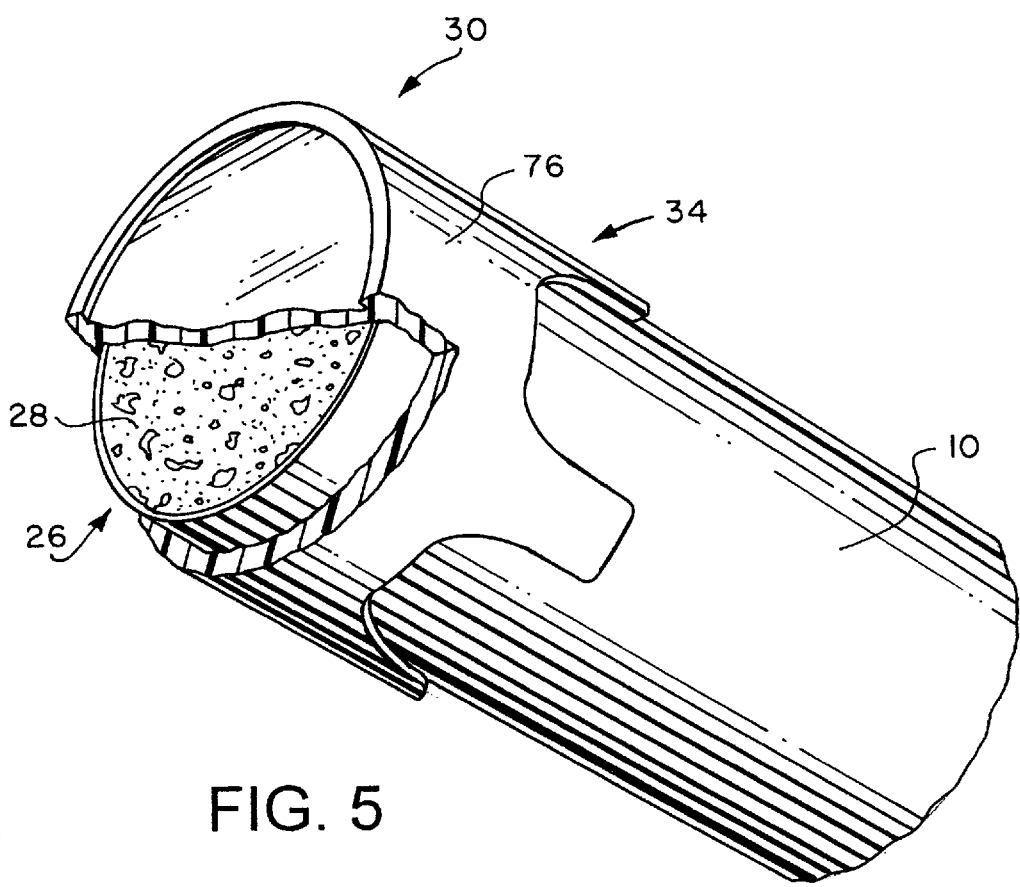
FIG. 5 is a perspective view of the end cover embodiment shown in FIG. 1, partially broken away, installed on an opened end of a food roll.

The same embodiment of end cover (30) is shown fully installed onto opened end (26) of a food roll (10) in FIG. 5. The end cover is installed onto the opened end in the same way as it is installed onto the rounded end of the food roll. A consumer who wishes to use the end cover on the opened end can cut the food roll in a manner that will minimize the length (29) of end (26). By minimizing this length, a consumer can ensure that exposed portion (28) of the food item lies within the tubular portion (76) of the retaining member (34) to limit its exposure to the environment.

To use the alternative embodiment shown in FIG. 4, the user will grasp the lip (164) on the elastic sleeve and roll it up towards end plate (32) to reduce the length of the sleeve. After the length of the sleeve is reduced, the sleeve is stretched open and placed over end (22) of the food roll. The sleeve is then unrolled to its full length, which positions the inside surface (166) against the external surface (16) of the food roll. Since the elastic sleeve (160) is now expanded from its relaxed diameter, the inside surface (166) encircling the food roll will form an interference fit with the external surface (16) and apply force to the external surface (16) to retain the end cover on the food roll.

The same procedure can be used to install the end cover onto the opened end of a food roll. A consumer who wishes to use the end cover in this manner can cut the food roll to minimize the length (29) of the opened end, to ensure that the inside surface (166) contacts and grips at least a portion of the major length (20) on the food roll.

While the preferred embodiments of the claims have been described, it should be understood that various changes, adaptions, and modifications may be made thereon without departing from the spirit of the invention and the scope of the appended claims.

What is claimed is:

1. An end cover for detachable connection to at least one of an opened and unopened end of a cylindrical food roll of a predetermined size and diameter, comprising:
   a) an end plate having an external side, an internal side, and a thickness therebetween;
   b) a retaining member having a proximate end connected to said end plate, and extending away from said internal side to a distal entry end adapted to receive an end of the food roll;
   c) said retaining member having an inside surface that provides an internal volume with a length and a substantially uniform cross section area sufficient to accommodate at least a portion of a food roll length;
   d) said retaining member having at least one gripping surface positioned on said inside surface to resiliently bear against and apply force to an external surface of the food roll, and at least one other surface adapted to apply force to the external surface of the food roll, when the food roll is inserted into said volume through said distal entry end.

2. An end cover as claimed in claim 1, further comprising an indicia surface recessed within said thickness of said end plate an inset distance from said external side.

3. An end cover as claimed in claim 2, further comprising a label adapted to display information, connected to said indicia surface and having a label thickness less than said inset distance.

4. An end cover as claimed in claim 1, wherein said retaining member comprises a tubular portion at said proximate end having a tube length that extends from said proximate end towards said distal entry end.

5. An end cover as claimed in claim 4, wherein said retaining member comprises a resilient beam member extending from said tubular portion towards said distal entry end, and said gripping surface is positioned on said beam member to resiliently bear against an external surface of said food cylinder to bias said food cylinder into contact with a portion of said inside surface found on said tubular portion.

6. An end cover as claimed in claim 5, further comprising an indicia surface recessed within said thickness of said end plate an inset distance from said external side.

7. An end cover as claimed in claim 6, further comprising a label adapted to display information, connected to said indicia surface and having a label thickness less than said inset distance.

8. An end cover as clamed in claim 4, wherein said retaining member comprises a plurality of resilient beam members extending from said tubular portion towards said distal entry end, and a gripping surface positioned on each said beam member to resiliently bear against and apply force to an external surface of the food roll when the food roll is inserted into said volume through said distal entry end.

9. An end cover as claimed in claim 8, wherein said beam members are evenly spaced on a circumference of said retaining member.

10. An end cover as claimed in claim 9, further comprising an indicia surface recessed within said thickness of said end plate an inset distance from said external side.

11. An end cover as claimed in claim 10, further comprising a label adapted to display information, connected to said indicia surface and having a label thickness less than said inset distance.

12. An end cover for detachable connection to one of an opened and unopened end of a cylindrical food roll of a predetermined size and a predetermined diameter, for the purpose of displaying information at an end of the food roll and for limiting the exposure of an opened end of the food roll to the environment, comprising:

a) an end plate having an external side adapted to display information, an internal side, and a thickness therebetween;

b) a retaining member having a proximate end connected to said end plate and extending from said internal side to a distal entry end adapted to receive the food roll;

c) an inside surface on said retaining member that provides an internal volume with a volume length and a substantially uniform cross section area adapted to receive at least a portion of a food roll length;

d) a tubular portion on said retaining member at said proximate end, having a tube length extending from said proximate end partway to said distal entry end;

e) a plurality of resilient beam members extending from said tubular portion towards said distal entry end, each said beam member having a gripping member, with a gripping surface found thereon, that extends from said beam members towards a central axis of said end cover, said gripping surfaces positioned on a gripping circumference with a gripping diameter that is less than the predetermined diameter of the food roll, whereby, when the end cover is installed upon an end of the food roll, said gripping surfaces resiliently bear against an external surface of the food roll to retain the end cover on the food roll.

13. An end cover as claimed in claim 12 wherein at least one of said gripping members has a forward sloped surface extending from said beam member to said gripping surface, facing said distal entry end of said retaining member.

14. An end cover as claimed in claim 13, wherein at least one said gripping member has at least two sloped surfaces extending from said resilient beam member to said gripping surface.

15. An end cover as claimed in claim 13, further comprising an indicia surface recessed within said thickness of said end plate an inset distance from said external side.

16. An end cover as claimed in claim 15, further comprising a label adapted to display information, connected to said indicia surface and having a label thickness less than said inset distance.

17. An end cover for detachable connection to one of an opened and unopened end of a cylindrical food roll having a predetermined size and a predetermined diameter, for the purpose of displaying information at an end of the food roll and for limiting the exposure of an opened end of the food roll from the environment, comprising:

a. an end plate having an external side adapted to display information, an internal side, and a thickness there between;

b. a retaining member having a proximate end connected to said end plate and extending away from said internal side to a distal entry end adapted to receive an end of the food roll;

c. said retaining member comprising a unitary elastic sleeve, having an inside surface with a relaxed, substantially uniform diameter that is less than the predetermined diameter of the food roll, and that is elastically expandable to at least the predetermined diameter of the food roll; whereby, when said elastic sleeve is placed over an end of the food roll, said inside surface encircles at least a portion of a length of the food roll and applies force to an external surface of the food roll to retain the end cover on the food roll.

18. An end cover as claimed in claim 17, wherein said distal entry end of said elastic sleeve terminates in a lip.

19. An end cover as claimed in claim 18, further comprising an indicia surface recessed within said thickness of said end plate an inset distance from said external side.

20. An end cover as claimed in claim 19, further comprising a label adapted to display information, connected to said indicia surface and having a label thickness less than said inset distance.

* * * * *